R. S. FLEMING.
FOOD PRODUCT AND METHOD OF MANUFACTURING THE SAME.
APPLICATION FILED OCT. 2, 1919.

1,361,239.

Patented Dec. 7, 1920.
3 SHEETS—SHEET 1.

R. S. FLEMING.
FOOD PRODUCT AND METHOD OF MANUFACTURING THE SAME.
APPLICATION FILED OCT. 2, 1919.

1,361,239.   Patented Dec. 7, 1920.
3 SHEETS—SHEET 2.

Raphael S. Fleming INVENTOR
BY Denison & Thompson
ATTORNEY

R. S. FLEMING.
FOOD PRODUCT AND METHOD OF MANUFACTURING THE SAME.
APPLICATION FILED OCT. 2, 1919.
1,361,239.
Patented Dec. 7, 1920.
3 SHEETS—SHEET 3.
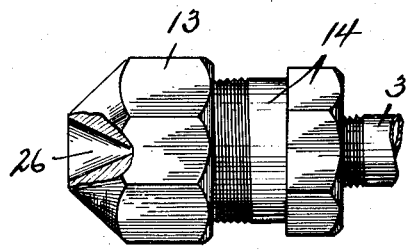
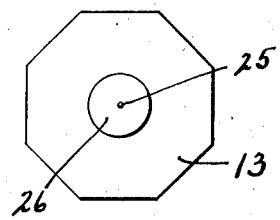
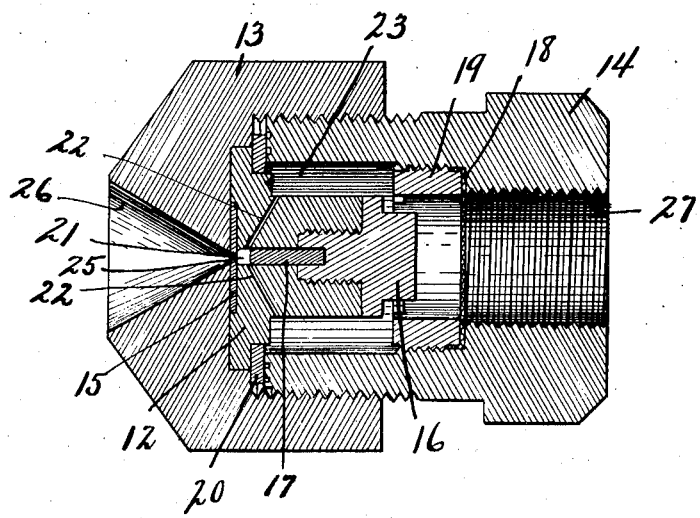

UNITED STATES PATENT OFFICE.

RAPHAEL S. FLEMING, OF SYRACUSE, NEW YORK, ASSIGNOR TO MERRELL-SOULE COMPANY, OF SYRACUSE, NEW YORK, A CORPORATION OF NEW YORK.

FOOD PRODUCT AND METHOD OF MANUFACTURING THE SAME.

1,361,239.  Specification of Letters Patent.  Patented Dec. 7, 1920.

Original application filed July 30, 1918, Serial No. 247,374. Divided and this application filed October 2, 1919. Serial No. 327,927.

*To all whom it may concern:*

Be it known that I, RAPHAEL S. FLEMING, of Syracuse, in the county of Onondaga, in the State of New York, have invented new and useful Improvements in Food Products and Methods of Manufacturing the same, of which the following, taken in connection with the accompanying drawings, is a full, clear, and exact description.

This invention relates to the production of certain new food products and to the process for producing the same and is a division of my application, Serial No. 247,374, filed July 30, 1918.

I have discovered that it is possible to make certain new and useful food products, particularly fruit products, including products of the citrus fruits, such as lemons, oranges, etc., as well as products of pineapples, logan berries, grapes, raspberries, strawberries, etc., and I have produced such new and novel products.

I have discovered a process whereby said new and novel products may be produced and have demonstrated that this process is commercially practical, efficient and economical.

My invention will be understood from a description of its application to one fruit, as lemons, the same being used as a specific illustration of its adaptability to other fruits, such as those heretofore named.

Large quantities of fruit, such as lemons, are wasted each year because the expense of marketing the same, often including large freight or express charges, is greater than the price for which they can be sold. Various causes lead to this result, such as scarcity and expense of labor, over-production, etc.

Further, there are large quantities of small or defective or injured, as for instance bruised, fruit that are not salable, or perhaps if salable cannot be profitably marketed, and my invention provides an outlet for such fruit by rendering valuable portions of the same substantially physically permanent and by reducing the bulk at the place of production to such an extent that the resultant product can be economically and profitably marketed.

I have found by experiment that lemon juice cannot be reduced to powder by atomizing the same into a current of heated or moisture-absorbing air by the process described in Stauf Patent No. 666,711, and in Bevenot & De Neveu Patent No. 1,020,632 for the desiccation of milk.

The resultant product was of a gummy nature quite different from a dry powdered product.

I have further found by experiment that a mixture of lemon juice and cane sugar cannot be reduced to a powdered product by said process, the result being substantially the same as when pure lemon juice was treated.

I have, however, discovered that a mixture of lemon juice and a suitable drying promoter consisting of, comprising or including a product obtained by the hydrolysis of starch, such as glucose or corn syrup, can be reduced to a substantially dry powder by atomizing a mixture of the said substances into a current of moisture-absorbing air as set forth above, whereby a soluble powder comprised of spherical particles is produced, and this is the more surprising because commercial glucose does not exist in crystalline form and no process has heretofore been known for reducing the same to such form.

I believe that I am the first to produce glucose in powdered form and by the spraying process I am able to produce such powdered glucose without the addition of any other substance.

The hydrolization of starch for the purpose of this process may be effected in any desired manner and I will specifically refer to two suitable methods.

First, the dilute acid method, and

Second, the diastase method.

First, when starch and water are heated with a dilute acid, the starch molecule is gradually and progressively split up into other carbo-hydrates, the main products in substantially the order produced being dextrin, maltose and dextrose. The product comprising dextrin, maltose and dextrose is commonly known as glucose or corn syrup.

Second, as illustrative, sprouted barley contains an active principle called a diastase, that will act on starch and convert it into dextrin, maltose and dextrose. Probably such products are progressively produced in a manner quite similar to their production by the acid treatment.

The hydrolysis of starch, therefore, either as stated by heating the same in combination with a dilute acid or by the action of a diastase will result in the production of dextrin, maltose and dextrose in various proportions depending upon the extent to which conversion has taken place. If the dilute acid method be adopted and the process arrested as soon as a cooled sample of the liquid ceases to give a blue color with iodin, the product contains a large proportion of dextrin, but if high pressure be employed and the action pushed farther dextrose is the chief product. It may be suggested that by boiling starch with dilute acid until the cooled liquid ceases to give a blue color with iodin, we have substantially pure dextrin. By continuing the boiling process, dextrin yields maltose and the further carrying of the process splits the maltose molecule into two parts of dextrose. These are products of hydrolyzed starch.

Dextrin alone combined with fruit juice, as lemon juice, dries easily and well and is doubtless the most valuable individual drying agent, but the resultant powder is somewhat unsatisfactory from a mechanical solubility standpoint and perhaps from the further fact that commercial dextrin, due doubtless to impurities or to the particular method of production, is somewhat bitter.

My experiments and tests lead me to believe that by far the best drying promoter is the product of hydrolized starch known as glucose, particularly when the process of hydrolysis is stopped at the point where the glucose embodies a large percentage of dextrin and a small percentage of dextrose.

*The Journal of Dairy Science* of January 1919 gives the following composition of corn syrup or glucose:

| | | |
|---|---|---|
| Dextrin | 29.8 to | 45.3 |
| Maltose | 4.6 " | 19.3 |
| Dextrose | 34.3 " | 36.5 |
| Ash | 0.32 " | 0.52 |
| Water | 14.20 " | 17.2 |

I have utilized with great success a glucose believed by me to contain considerably less than 22% of dextrose and approaching 50% of dextrin.

The lemon or other juice may be obtained in any suitable way as by compressing or squeezing the lemon and the juice is then thoroughly mixed with a proper quantity of glucose or the derivatives or constituents of glucose, as used by me in actual practice corn syrup of high dextrin content.

The mixture may be sprayed or atomized as by forcing the same under high pressure through a minute orifice, and in this form is introduced into a current of heated or moisture absorbing air.

The liquid content is substantially, completely and instantaneously vaporized and the product collects in the form of a fine practically dry powder.

I have found that a mixture of 100 pounds of lemon juice and 50 pounds of corn syrup produces a very desirable produce. With orange juice a lower percentage of corn syrup is desirable and I have found that a mixture of 100 pounds of orange juice and 20 pounds of corn syrup produces an excellent powdered product that may be reconstituted by the mere addition of water. And in drying various juices particular percentages of materials will be found peculiarly advantageous.

In the accompanying drawings I have disclosed an apparatus peculiarly adapted for carrying out the desiccating step involved in the process herein.

Fig. 4 is a side elevation of a suitable spray nozzle.

Fig. 5 is an end elevation of the same.

Fig. 6 is a longitudinal section of the same.

Figure 1:
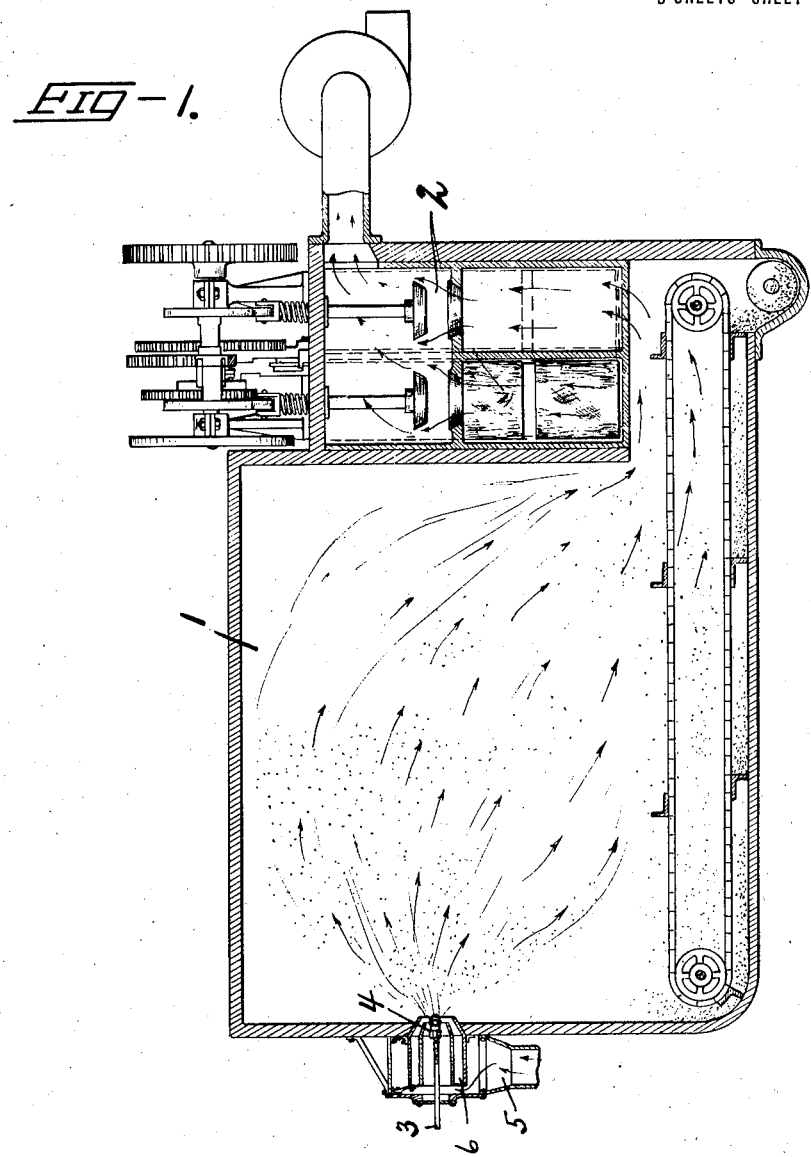
Figure 1 is a sectional view of such apparatus.
Figure 2:
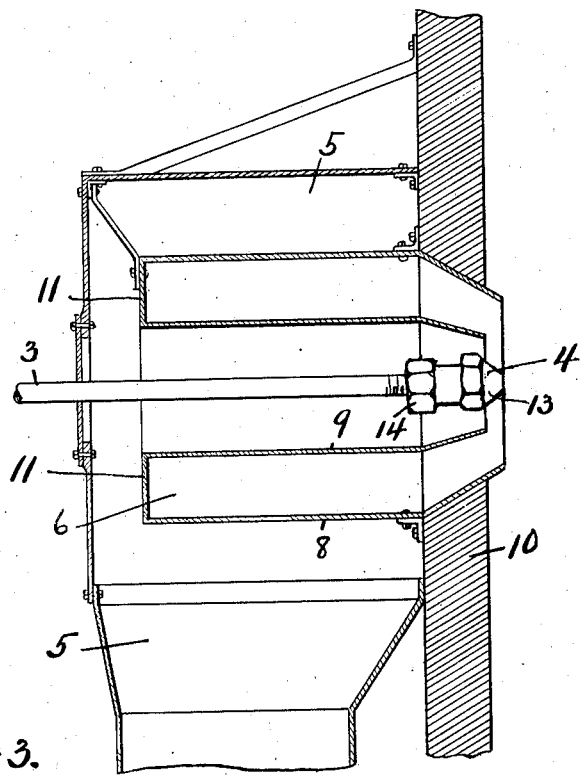
Fig. 2 is an enlarged sectional view of the air introducing device.
Figure 3:
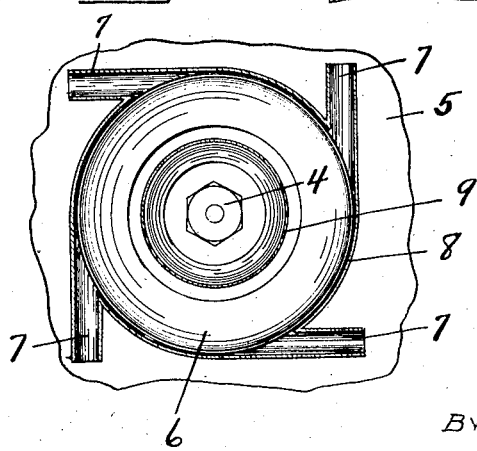
Fig. 3 is a section of the air introducing device taken at right angles to Fig. 2.

The general form of the desiccating chamber and collector disclosed in Fig. 1 is substantially the same as the structure disclosed in Letters Patent, No. 1,088,436, issued Feb. 24, 1914 to Merrell-Soule Co., as the assignor of I. S. Merrell, while the air introducing devices are substantially the same as those disclosed in Letters Patent, No. 1,102,601 issued to Merrell-Soule Co. as the assignor of Irving S. Merrell and Oliver Edward Merrell, and the spray nozzle shown is substantially the same as that disclosed in Letters Patent No. 1,183,393 issued to Merrell-Soule Co. as the assignor of Irving S. Merrell and Oliver Edward Merrell.

The desiccating devices comprise a desiccating chamber —1— of any suitable form and shape having a suitable screened outlet or dust collector —2—, the construction of the latter being substantially the same as that shown in said Letters Patent referred to. The mixture of juices and the drying promoter is forced under high pressure through a pipe —3— terminating in the spray nozzle —4— by means of which the solution is divided into infinitesimal particles. This atomized or sprayed solution is injected into a current of heated air introduced through the air conveying devices with the result that the liquid, instantaneously and practically completely vaporized, is conveyed from the desiccating chamber preferably through suitable screening devices while the practically dry powder gravitates to the floor of the chamber or is collected and separated from the air by the screening devices.

The air introducing devices shown comprise a wind trunk —5— through which heated air is forced by any suitable air blower or pump (not shown). This trunk communicates with an air whirling chamber —6— disposed intermediate the wind trunk and the desiccating chamber. This chamber —6— is preferably substantially circular in cross section and receives heated air under pressure from the trunk —5— through a plurality of tangential inlet channels —7—. These channels are shown as four in number, equally spaced around the whirling chamber and of substantially equal conveying capacity. Each channel may extend the length of the cylindrical part —8— of the chamber —6—. The air forced from the trunk —5— through these tangential channels is set into rapid whirling motion by the cylindrical walls —8— and —9— of said chamber. The axis of the chamber —6— is preferably horizontal and at substantially right angles to one of the walls —10— of the desiccating chamber —1—. This air whirling chamber may be formed by a pair of substantially concentric walls —8— and —9— connected at their rear by a transverse annular wall —11— each of said concentric walls having its forward end tapered forwardly to form an annular constricting outlet communicating with the desiccating chamber and preferably the taper of the wall —8— is somewhat greater than the taper of the wall —9— to further restrict the outlet and increase the pressure under which the air passes into the desiccating chamber. The wall —9— may terminate a short distance at the rear of the termination of the wall —10— and, as the wall —9— is open at its rear, it constitutes a substantially cylindrical chamber through which the pipe —3— passes to spray nozzle —4— and preferably the forward end of the spray nozzle is just in front of the termination of the wall —8—. This cylindrical chamber formed within the wall —9— communicates at its rear with the trunk —5— and acts to convey a direct current of air surrounding and enveloping the spray as it is propelled from the spraying device all surrounded and enveloped by the whirling current of air issuing from chamber —6—. This construction is peculiarly efficient both in effecting instantaneous and substantially complete vaporization of the liquid constituents of the solution and in effecting an economy in space due, perhaps, to the rotary movement of the air and spray.

The spraying device as shown in Fig. 6 comprises a body —12—, a cap —13—, a casing —14— secured to the cap by threaded engagement in such a manner as to confine the body —12— between the cap —13— and the casing —14—. Further the nozzle comprises a spray disk —15—, a plug —16—. a plug pin —17—, a screen —18—, a screen supporting ring —19— and a washer —20— all arranged in substantially the manner disclosed in the aforesaid pattern so that the body —12— has a liquid whirling chamber —21— at the middle of its outer side to which the liquid is conveyed by two ducts —22— which communicate at their outer ends with the chamber —23— of the casing. The spray disk has a minute central orifice —25— communicating with the whirling chamber —21— and leading to the evase ajutage —26— formed in the cap —13—. The casing —14— is interiorly threaded at —27— to receive the liquid conveying pipe —3— through which the liquid is forced under high pressure (as 2000 to 3000 pounds to the square inch) by any suitable means as a pump (not shown).

The operation of this particular desiccating apparatus is substantially as follows. The air is introduced under pressure through the trunk—5—and forced into the desiccating chamber through the concentric chambers of the air introducing device in the manner heretofore described. The liquid is introduced into this current of heated air in atomized condition and is carried spirally forward by the heated air and the liquid constituents are substantially completely vaporized. A portion of the powder gravitates to the bottom of the desiccating chamber and the remaining portions carried by the air escape into the dust collecting or screening device —2— whereby the air and vapor are separated from the powder carried thereby, the air and vapor escaping while the powder is retained within the collecting device and in the use of this particular apparatus the powder is later deposited within the desiccating chamber and commingled with the powder primarily collecting therein.

In referring to the product of the spray process described herein as comprising or consisting of spherical particles, I mean to include particles constituting complete spheres or fragments thereof.

The expressions "a product of hydrolyzed starch" and "a product obtained by the hydrolysis of starch" are deemed to include not only the immediate product such as glucose of varying contents of dextrin, dextrose and maltose, but also the derivatives or components of such product.

It will be understood that I have described a particular method of desiccation of the solution of fruit juice and drying promoter as illustrative of a, perhaps, preferred method of carrying out this step of the process in the production of a substantially dry powder comprising spherical particles and that various modifications and changes may be made in the process or that other processes of desiccation may in certain cases be substituted in reducing fruit juices to powder by the use of a drying promoter comprising a product of the hydrolysis of starch or a derivative or component of such product all without departing from my invention as set forth in the appended claims.

What I claim is:

1. A product in powdered form comprising fruit material combined with a drying promoter comprising a product obtained by the hydrolysis of starch.

2. As a new article of manufacture a substantially dry substance comprising the solids of fruit juice combined with a drying promoter comprising a product of the hydrolysis of starch.

3. As a new article of manufacture a substantially dry substance comprising the solids of the juice of a citrus fruit combined with a drying promoter comprising a product obtained by the hydrolysis of starch.

4. As a new article of manufacture a substantially dry substance comprising the solids of the juice of a citrus fruit combined with glucose.

5. The solution in water of a substance comprising the solid of fruit juice combined with a drying promoter including a product obtained by the hydrolysis of starch.

6. A product in powdered form comprising fruit material and glucose.

7. A product in powdered form consisting of spherical particles, and comprising fruit material and glucose homogeneously combined.

8. A product in powdered form consisting of spherical particles and comprising citrus fruit material and glucose homogeneously combined.

9. A product in powdered form consisting of spherical particles and comprising fruit material combined with a drying promoter including a product obtained by the hydrolysis of starch.

10. A product in powdered form consisting of spherical particles and comprising the solids of fruit juice combined with a drying promoter including a product of hydrolyzed starch.

11. A product in powdered form comprising fruit material combined with a drying promoter comprising a product of hydrolyzed starch.

In witness whereof I have hereunto set my hand this 10th day of September, 1919.

RAPHAEL S. FLEMING.

Witnesses:
H. E. CHASE,
MARGARET L. STOUP.